US000001372H

United States Statutory Invention Registration [19]

[11] Reg. Number: H1372

Glasscock et al.

[43] Published: Nov. 1, 1994

[54] METHOD FOR MATING FLOATING SECTIONS OF AN OFFSHORE STRUCTURE

[75] Inventors: Maynard S. Glasscock, Houston, Tex.; Gerasime M. Monopolis, Morristown, N.J.

[73] Assignee: Exxon Production Research Company, Houston, Tex.

[21] Appl. No.: 90,711

[22] Filed: Jul. 12, 1993

[51] Int. Cl.[5] ..... E02B 17/00
[52] U.S. Cl. ..... 405/204
[58] Field of Search ..... 405/224, 203, 204

[56] References Cited

U.S. PATENT DOCUMENTS

| | | | |
|---|---|---|---|
| 2,597,110 | 5/1952 | Lacy | 405/204 |
| 3,736,756 | 6/1973 | Lloyd | 405/205 X |
| 3,859,806 | 1/1975 | Guy et al. | 405/204 |
| 4,014,567 | 3/1977 | Arnold et al. | 405/204 |
| 4,106,302 | 8/1978 | Vogel | 405/204 X |

*Primary Examiner*—David Brown
*Attorney, Agent, or Firm*—K. A. Bell

[57] ABSTRACT

A method for horizontal mating of multiple floating sections of an offshore platform using a single point mooring is disclosed. The single point mooring is installed at a predetermined mating site. The first section of the platform is transported to the mating site. Anchor handling vessels tow the section to the single point mooring and connect it to that mooring. Subsequent sections of the platform are then transported to the mating site while an anchor handling vessel attends to the horizontally floating moored sections. When all sections have been mated together at the mating site, the platform is disconnected from the single point mooring and towed to the installation site.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MATING FLOATING SECTIONS OF AN OFFSHORE STRUCTURE

FIELD OF THE INVENTION

The present invention relates generally to construction of offshore structures. Specifically, but not by way of limitation, the present invention pertains to a method of mating multiple floating sections of an offshore structure using a single point mooring.

BACKGROUND OF THE INVENTION

Offshore platforms are generally built in onshore fabrication yards where the entire platform is fabricated in one piece. Once the platform is ready for installation offshore, the platform is loaded onto a launch barge which transports the platform to a predetermined installation site. The platform is then launched into the ocean and installed.

When the oil and gas industry seeks to develop petroleum reserves in deep water, the platforms are necessarily much larger and longer. Where platform specifications exceed the capability of existing launch barges and fabrication yard capacities, the platforms must be fabricated in sections of a size that can be handled by the launch barges available for a particular development. These sections are then launched individually and joined together offshore.

Currently, both vertical and horizontal offshore joining methods are utilized. Joining the sections of an offshore structure using these existing methods is limited by a number of factors, including weather conditions (wind, wave, current); safety; costs associated with the mooring equipment (if horizontally joined) or lowering equipment (if vertically joined) and the launch barges and other vessels necessary to perform the joining of the sections; the number of vessels required; and the time required to launch, moor or lower, and join the sections. In addition, few presently available vessels have the capacity required to join sections of an offshore structure designed for deep water installation using existing joining methods. All of these limitations are alleviated by the present invention.

Industry has utilized a multiple point mooring concept to accomplish horizontal joining of offshore structures. Typically, two construction vessels and three mooring barges (or one construction vessel and four mooring barges) are required. Each section of the offshore structure is transported on an individual launch barge to the joining site where it is launched. The sections are then attached to barges which are moored to the ocean floor. Alternatively, the sections themselves may be moored to the ocean floor from their four corners independent of the construction vessels. By independently mooring the sections, the joining operation can withstand storms of much greater intensity than if the construction vessels remained attached to the sections. The independent mooring procedure is possible because the construction vessels are self-equipped to moor themselves to the ocean floor. Consequently, the need to purchase and design a mooring system to handle the additional loads that would be created by the construction vessels if they were attached to the moored sections is eliminated.

The major disadvantages of these horizontal joining procedures are the number of launch barges required, the expense of the mooring barges and/or the complex mooring array, and the limited ability of the construction vessels to withstand high intensity storms. These high intensity storms also restrict the procedures to a very short time frame in rougher ocean environments such as the Gulf of Mexico. Because of the restricted time frame, the demand for the launch vessels needed to perform a joining often exceeds the supply.

The vertical joining procedure addresses the problem of demand for launch barges and the associated costs as it only requires one launch barge. With this procedure, the launch barge is used to transport each section to the joining site. When the first section arrives at the joining site onboard the launch barge, a construction vessel is required to lower and permanently secure it to the seafloor after it is launched. The section may be secured using piles, or may be attached to a preinstalled foundation or base assembly. The construction vessel must then remain idle at the site while the launch barge returns to the fabrication yard to load and launch the other sections at the joining site. The cost savings derived from elimination of one launch barge is largely offset by the cost associated with the idle construction vessel.

Both horizontal and vertical joining procedures must be designed to withstand loads exerted by the offshore environment. Accordingly, a procedure is desired that will reduce hydrodynamic forces exerted on the mooring system. If the number of mooring lines and other equipment (such as mooring barges) can be reduced, the joining procedure will be simplified and hydrodynamic forces exerted on the mooring system lowered, thus leading to lower mooring loads and reduced equipment requirements. A simplified procedure would also reduce the costs associated with the joining procedure. A need also exists to design a system that can withstand strong weather conditions and be used virtually year round.

The present invention is designed to withstand weather conditions more severe than joining procedures envisioned to date can withstand, eliminate the need for more than one launch barge, reduce construction vessel time, reduce the amount of equipment necessary to perform the mooring and joining procedure, reduce the hydrodynamic loads exerted on the mooring system, and place no seasonal restrictions on when the joining procedure may be performed. Furthermore, the present invention addresses the need for a method to join sections of an offshore platform designed for deep water installation using currently available vessels.

SUMMARY OF THE INVENTION

The present invention is a method for mating multiple floating sections of an offshore structure. In a preferred embodiment of the invention, the method involves use of one launch barge to transport and launch the multiple floating sections at the mating site. Prior to arrival of the first section, Anchor Handling Vessels (AHV), which are tugs, work boats, or other similarly equipped offshore support vessels, install a single point mooring apparatus at the mating site. The single point mooring apparatus may be any point moored system which allows full 360° weathervaning motion of an attached vessel or structure. Such single point moorings are well known in the art. The AHVs are then used to attach the first section to the single point mooring after the section is launched by the launch barge. One end of the section is secured to the single point mooring with mooring lines. While the launch barge returns to the fabrication yard to load another section, one AHV attends the section which is floating horizontally at the mating site secured to the single point mooring. The AHV warns off other vessels entering the vicinity of the mating site and, when necessary, pulls on the moored section to maintain tension in the mooring lines which are securing the section to the single point mooring. The AHV also weathervanes with the section.

When the launch barge returns to the mating site with the next section, the section is launched downstream of and towards the moored section. A construction vessel may be mobilized to the moored section to install the hardware required to join the sections and to assist in the joining of the sections. This procedure is repeated for each subsequent section of the offshore structure. When all sections are joined together, the offshore structure is disconnected from the single point mooring and towed to the installation site.

In a second embodiment of the invention which eliminates the need for a launch barge completely, the sections are fabricated in a dry dock. When fabrication is complete, the dry dock is flooded and the floating sections are towed by the AHVs to the mating site.

BRIEF DESCRIPTION OF DRAWINGS

The advantages of the present invention will be more easily understood by referring to the following detailed description and the attached drawings where.

Although the invention will be described according to the preferred embodiments, that description is not intended to be limiting. Accordingly, the invention encompasses all alternatives, modifications, and equivalents which may be included within the spirit and scope of the invention, as defined in the appended claims.

DETAILED DESCRIPTION

The present invention is a method for mating multiple floating sections of an offshore structure using a single point mooring. The method of the present invention permits the structure to weathervane with the prevailing wave and current environment.

Although the invention is described and illustrated herein as a method for mating multiple floating sections of an offshore structure, the invention may encompass other embodiments and variety of alternative uses. To the extent that the following detailed description is specific to a particular embodiment or a particular use, it is intended only as illustrative and not intended to limit the invention.

Figure 1:
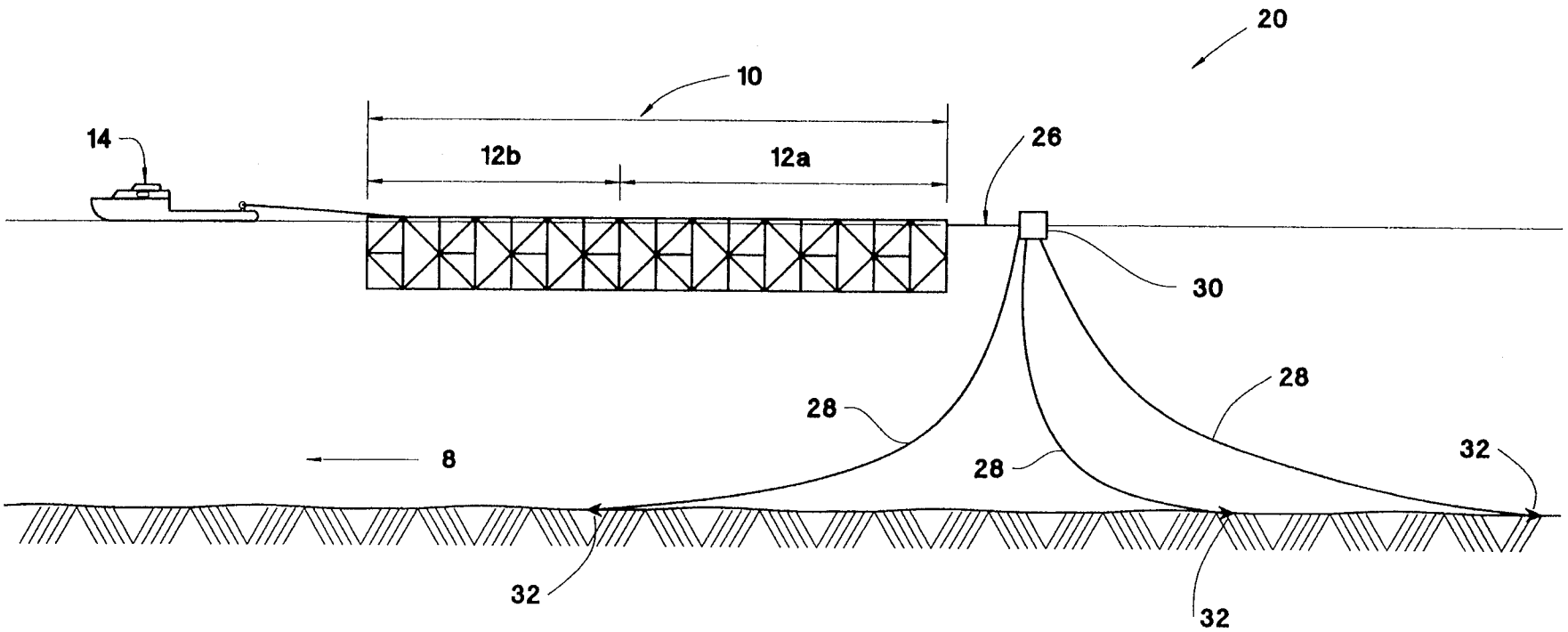
FIG. 1 is an elevation view of the present single point mooring mating concept.
Figure 2:
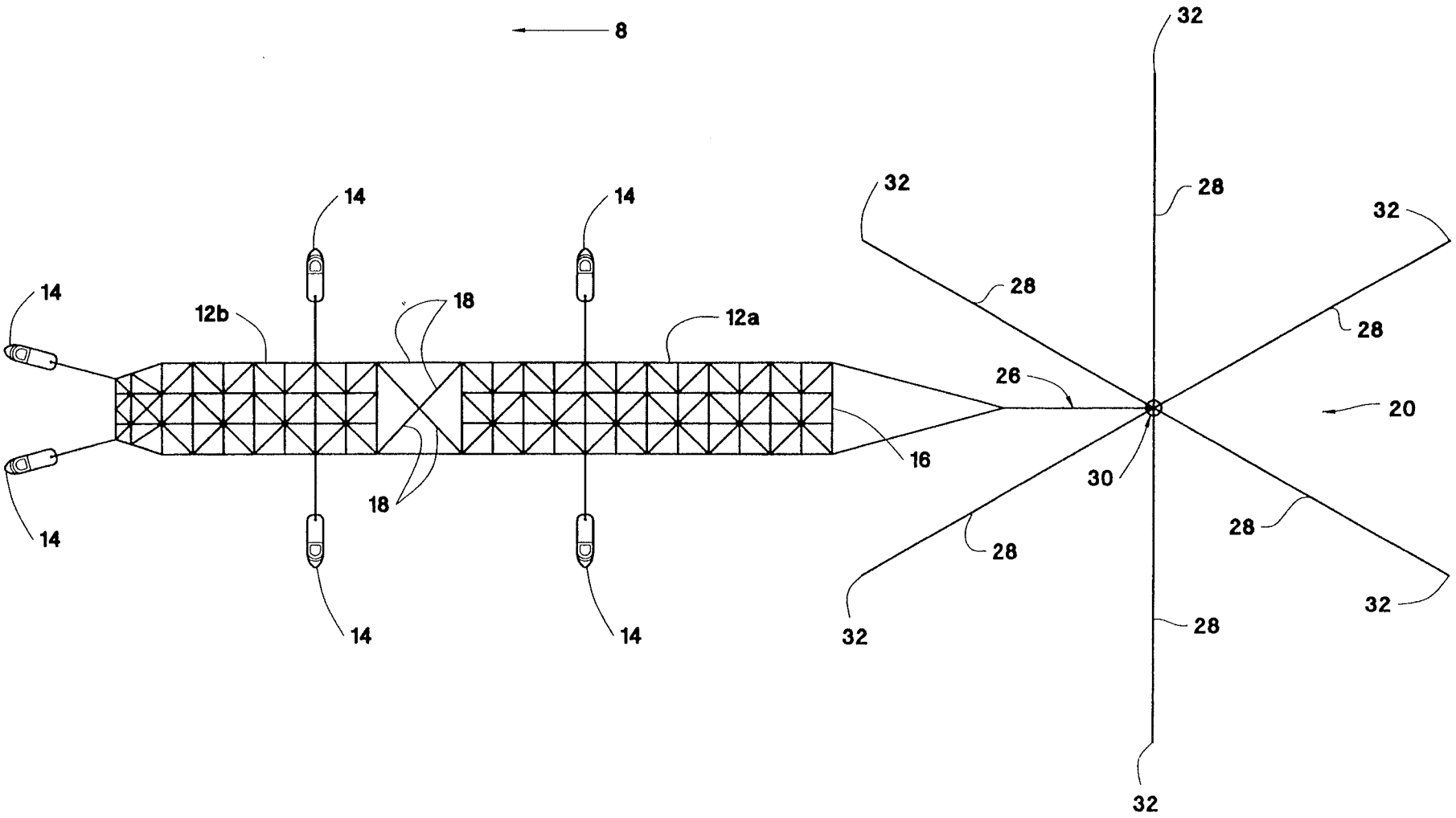
FIG. 2 is the plan view of the present single point mooring mating concept.

The concept for mating multiple sections 12 of an offshore structure 10 with a single point mooring 20 is generally illustrated in FIGS. 1 and 2. To use the present method, the single point mooring 20 must be installed at a predetermined mating site after which the multiple sections 12 of the offshore structure 10 are transported to the mating site. Typically the sections 12 of the offshore structure 10 are transported to the mooring site one at a time on a launch barge (not shown) towed by one or more Anchor Handling Vessels 14. The sections 12 are then launched into the water near the mooring site and are towed to the single point mooring 20 by the Anchor Handling Vessels 14 while floating horizontally in the ocean. Alternatively, the sections 12 may be towed to the mating site while floating in the water, possibly with the assistance of auxiliary buoyancy tanks (not shown).

The first step of the present method is to install the single point mooring 20 at the predetermined mating site. Typically, the single point mooring 20 comprises a buoy 30, mooring chains 28, and anchors 32. The predetermined mating site is typically in 400 to 600 feet of water. A shallower water depth site for the single point mooring 20 would increase the risk of a section 12 striking the seafloor after launch and potentially incurring structural damage. Deeper water depths unnecessarily increase single point mooring 20 cost. Typically the single point mooring 20 is installed by conventional means using Anchor Handling Vessels (AHV).

During the mating procedure, the single point mooring 20 provides an initial orientation of the first mooring section 12*a*. The mooring chains 28 and anchors 32 are designed with sufficient capacity to provide anchor points to resist mooring loads. It will be understood by those skilled in the art that other suitable single point mooring 20 components exist which will provide sufficient mooring load resistance capacity. The single point mooring 20 is also designed to permit the moored section 12*a* to freely rotate around the axis of the single point mooring 20, and thereby be aligned with the prevailing ocean current 8 at any given time. The single point mooring 20 may comprise a surface buoy 30 or a submerged buoy 30. Other embodiments having a mechanism permitting the mooring line 26 to rotate 360° around the axis of the single point mooring 20 will be apparent to those skilled in the art.

Figure 3:
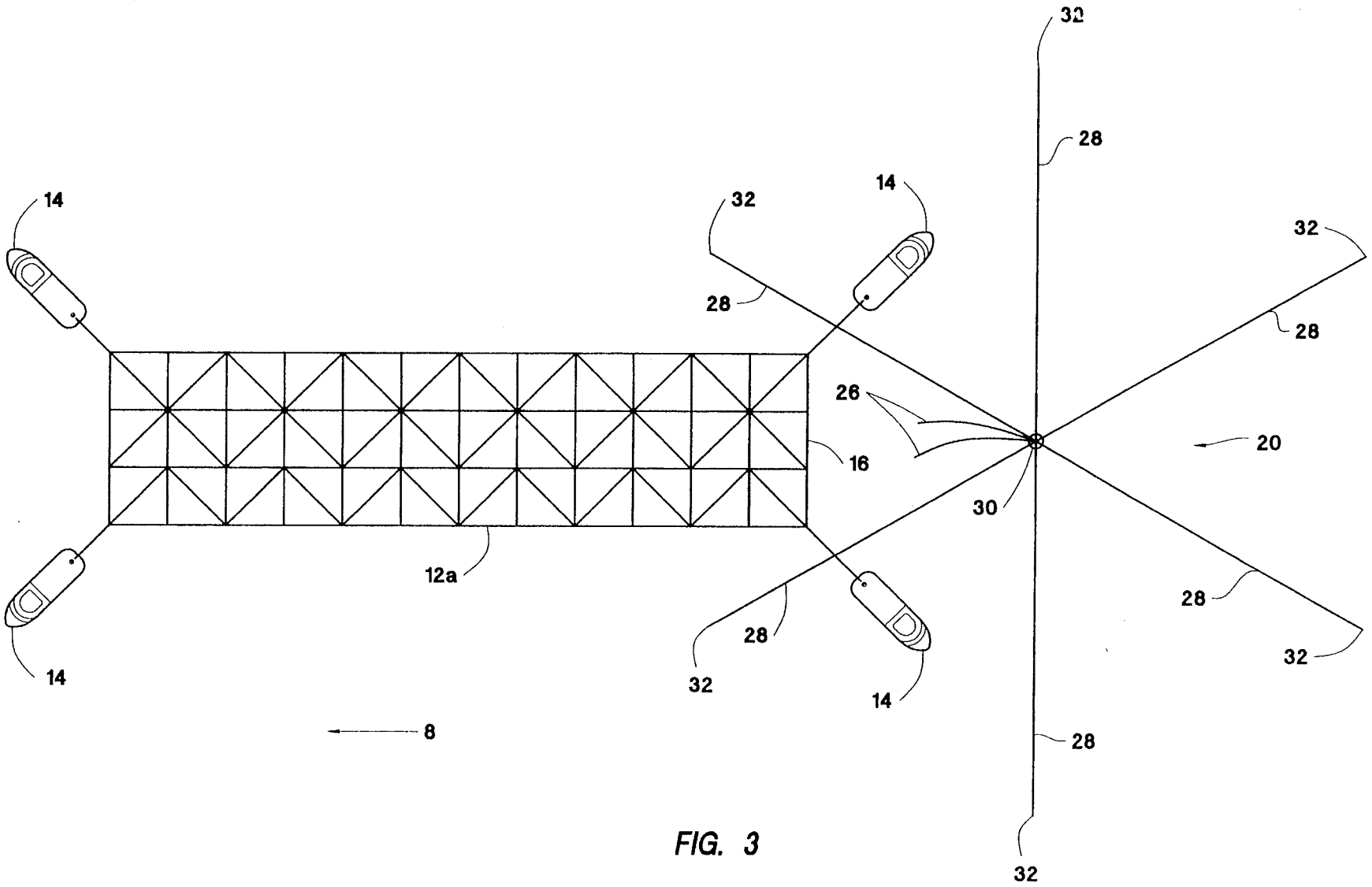
FIG. 3 is a plan view illustrating the positioning of an offshore structure prior to attaching the structure to the single point mooring.

Next, first section 12*a* of the offshore structure 10 is transported to the mating site, launched, and connected to the single point mooring 20. After first section 12*a* is launched at the mating site, the section is towed using AHVs to the single point mooring 20 from the downstream side of the single point mooring 20 and connected to the single point mooring with a mooring line 26, as illustrated in FIG. 3. The downstream side of single point mooring 20 is opposite to the direction from which the predominant current 8 flows and can be determined by visual observation or by use of a current measurement device. The mooring line 26 may consist of one or more individual mooring lines. The mooring line 26 may be made of chains, wire cable or strand, nylon, polyester or other suitable materials that will be known to those skilled in the art. The mooring line 26 is connected to the non-mating end 16 of the first section 12*a* by conventional means. Mooring line 26 will be of sufficient length to allow the moored section 12*a* to adequately clear the anchor lines 28 after the mooring line 26 is attached to the section 12*a*. For example, either a bridle type configuration of mooring lines 26 or a mooring line 26 threaded through a swivel fairlead located on the section 12*a* may be used. Other methods of connecting the section to the single point mooring 20 will be apparent to those skilled in the art. The launch barge returns to the fabrication yard to load out the next section 12*b* while the first section 12*a* is being moored to the single point mooring 20.

Once the first section 12*a* is moored to the single point mooring 20, the single point mooring 20 permits the section 12*a* to weathervane in the ocean while the next section 12*b* is being transported to the mating site. During this time, one AHV remains at the mooring site to attend to the single point mooring 20 and the moored section 12*a*. The AHV is used to maintain tension in the mooring lines 26 and to warn off other vessels in the vicinity of the mating site. Prior to the arrival of the next section 12*b* of the structure 10, a construction vessel is mobilized to the mating site to install winches and any other construction aids on the moored section 12*a* and to assist in mating the sections 12 of the structure 10. Upon arrival of the construction vessel, the construction vessel is attached to the moored section 12*a* by conventional means. For example, the construction vessel may be attached to the section 12*a* by cables and a fendering system. Other methods of attachment will be known to those skilled in the art. Once the construction vessel is attached to the moored section 12*a*, the entire assembly weathervanes with the ocean's prevailing environment.

The next section 12*b* is towed toward the moored section 12*a* from the downstream side of the moored section 12*a* as illustrated in FIG. 2. AHVs may be used to orient the section 12*b* into the direction of the prevailing current as the section 12*b* is towed towards the moored section 12*a*. The two sections 12*a* and 12*b* are connected together with winch lines 18 located between the sections 12*a* and 12*b* and are pulled together using winches. The winches must allow for dynamic loads and have a sufficient maximum pulling force. Winch requirements will be apparent to those skilled in the art. An AHV may be used to connect the sections 12*a* and 12*b* together with winch lines which attach to the winches located on both sections and which are used to pull the sections together. Other methods of pulling the sections 12*a* and 12*b* together will be apparent to those skilled in the art. The two sections 12*a* and 12*b* are mated using mechanical or hydraulic pipe connectors, grouting, or other conventional means known to those skilled in the art. The construction aids are then removed and the structure 10 is inspected to ensure proper mating was accomplished. This process will be repeated until all sections 12 of the structure 10 are mated. Once all sections 12 are mated, structure 10 is disconnected from the single point mooring 20 and towed to the installation site for installation. The time interval between final assembly and disconnect may range from hours to months.

As described above, the present invention satisfies the need of a joining mechanism that is immune to weather conditions, has minimal equipment and vessel requirements, and reduces hydrodynamic loads. However, this invention should not be unduly limited to the foregoing which has been set forth solely for illustrative purposes.

What we claim is:

1. A method for mating the first and second floating sections of an offshore structure at a mating site in the ocean comprising the steps of:

(a) installing a single point mooring at said mating site;

(b) towing said first floating section to said mating site;

(c) attaching said first floating section to said single point mooring;

(d) towing said second floating section to said mating site; and (e) mating said second floating section to said first section so that the mated sections freely rotate about said single point mooring.

2. The method of claim 1 wherein said offshore structure comprises one or more additional floating sections and wherein said method further comprises the steps of:

(a) towing said first additional floating section to said mating site;

(b) mating said first additional floating section to said mated section so that the mated sections freely rotate about said single point mooring; and (c) repeating steps (a) and (b) for each subsequent section of said additional floating sections.

* * * * *